United States Patent Office 3,794,669
Patented Feb. 26, 1974

3,794,669
PROCESS FOR CONVERTING OXATHIOLANES, DITHIOLANES AND DITHIANES TO ALDEHYDES OR KETONES
Hans Wynberg, Groningen, Netherlands, David W. Emerson, Dearborn, Mich., and Wilhelmus F. J. Huurdeman, Groningen, Netherlands, assignors to E. R. Squibb & Sons, Inc., Lawrenceville, Princeton, N.J.
No Drawing. Filed Aug. 4, 1971, Ser. No. 169,127
Int. Cl. C07c 169/50
U.S. Cl. 260—397.2    4 Claims

ABSTRACT OF THE DISCLOSURE 1,3-oxathiolanes, 1,3-dithiolanes and 1,3-dithianes may be readily converted to aldehydes or ketones by treatment with chloramine-T.

SUMMARY OF THE INVENTION

This invention relates to a process for readily converting 1,3-oxathiolanes, 1,3-dithiolanes or 1,3-dithianes to aldehydes or ketones which comprises treating the 1,3-oxathiolanes, 1,3-dithiolane or 1,3-dithiane with about 1 to 4 moles of chloramine-T.

BACKGROUND OF THE INVENTION

A variety of 1,3-oxathiolanes, 1,3-dithiolanes and 1,3-dithianes are known having the general formula

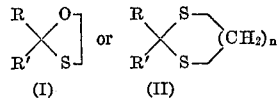

wherein R and R' represent a variety of acyclic or cyclic groups and $n$ is 0 or 1. They are known as quite stable compounds. Because of the stobility of this group to chemical treatment, the formation of such 1,3-oxathiolanes, 1,3-dithiolanes and 1,3-dithianes has been suggested as a means of protecting the carbonyl group of aldehydes or ketones during chemical synthesis. See, for example, Romo et al., Jour. Am. Chem. Soc. 73, 4961 (1951); Djerassi et al., ibid. 75, 3704 (1953); Daum et al., Tetrahedron Letters No. 2, 165–167 (1967). It has been found difficult, however, because of their stability, to remove the protecting group and regenerate the carbonyl group. To accomplish this, vigorous treatment with acid, treatment with heavy metal salts such as silver or mercury salts, N-bromosuccinimide or N-chlorosuccinimide or desulfurization with Raney nickel have been used. None of these methods is widely useful and they frequently give poor results.

It has now been found that treatment of the 1,3-oxathiolane, 1,3-dithiolane or 1,3-dithiane with chloramine-T (N-chloro-p-toluenesulfonamide sodium) under mild conditions converts the oxathiolane, dithiolane or dithiane to an aldehyde or ketone in high yield.

DETAILED DESCRIPTION OF THE INVENTION

According to this invention, a 1,3-oxathiolane, 1,3-dithiolane or 1,3-dithiane of Formula I or II above is converted by treatment with chloramine-T under mild conditions to an aldehyde or ketone of the formula (III)    

R and R' may each represent an acyclic or cyclic group or the two together may form with the carbonyl group a cyclic ketone. Either R or R' may thus be an unsaturated or saturated alkyl group, a carbocyclic aryl group which may be monocyclic or polycyclic, an aralkyl group or together R and R' may form the residue of a cyclic ketone. In the case of an aldehyde, R is, of course, hydrogen.

The alkyl groups may be straight or branched chain saturated or unsaturated hydrocarbon groups, e.g., alkyl groups and alkenyl groups having one or two double bonds, each type having up to about twelve carbon atoms, as well as acetylenic groups having up to about four carbon atoms, especially the lower alkyl groups of up to eight carbon atoms, for example, methyl, ethyl, propyl, isopropyl, butyl, isobutyl, t-butyl, amyl and the like, and their monosaturated, double bonded analogs. Carbocyclic aryl groups include rings such as benzene, naphthalene, anthracene, fluorene and the like. The aralkyl groups include such rings attached to a lower alkyl group of the type referred to above. Also included are polycyclic compounds of which the steroids are a particular example. Various series of steroids are include, especially steroids of the pregnane and androstane series, and the invention is particularly directed to the carbonyl groups in the 3-, 17- and 20-positions of the steriods [see J.A.C.S. 69, 562 (1947)].

R and R' may each also represent a cycloaliphatic group, e.g., the alicyclics of three to seven carbon atoms such as cyclopropyl, cyclobutyl, cyclopentyl, cyclohexyl or cycloheptyl, including those with a double bond, especially the 5- and 6-membered groups. R and R' may also together form a cyclic ketone of such a group, e.g., cyclobutanone, cyclopentanone, cyclohexanone or cycloheptanone.

All of the foregoing groups may be simply substituted, e.g., bearing one or more substituents such as esters, amides, ethers, cyano or nitro groups as well as additional carbonyl groups. The steroids may include the well known substituent groups, e.g., in the 4, 6, 9, 11, 12, 14, 15, 16, 17 and 21-positions.

Illustrative aldehydes and ketones which may be obtained by the process of this invention include benzaldehyde, valeraldehyde, caproaldehyde, enanthaldehyde, isobutyraldehyde, propiolaldehyde, benzophenone, cyclopentanone, fluorenone, methyl ethyl ketone, cyclohexanone, acetophenone, cholestan-3-one, methyl t-butyl ketone, ethyl acetoacetate and the like.

The 1,3-oxathiolanes and 1,3-dithiolanes of Formulas I and II above are produced by the reaction of an aldehyde or ketone with 2-hydroxyethanethiol or ethanedithiol in the presence of zinc chloride at about room temperature in a closed reaction vessel for about an hour or more, or by refluxing in the presence of boron trifluoride etherate.

1,3-dithianes of Formula II, i.e., wherein $n$ is 1, are produced from 1,3-dithiane as follows:

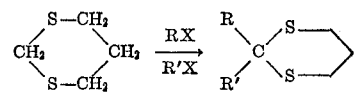

When R and R' together complete a cyclic group, an α,ω-dihalo compound, e.g., X—R—R'—X is used. For example, if R and R' form a cycloalkyl group with the carbon of the dithiane, the 1,3-dithiane is treated with a dihaloalkane such as 1,3-dibromopropane. X in the foregoing represents halogen, preferably bromine or chlorine. This reaction is effected in the presence of lithium in a solvent such as ether.

The 1,3-oxathiolane or 1,3-dithiolane may be suspended or dissolved in a solvent in which chloramine-T is soluble and stable, e.g., a water immiscible organic solvent such as alcohols, preferably lower alkanols, glycols, ether, dioxane, carbitols, dimethylformamide or the like. An alcohol-water mixture, especially methanol-water, containing upwards of 75% alcohol (by vol.) is most preferred.

The treatment of the 1,3-oxathiolane, 1,3-dithiolane or 1,3-dithiane with chloramine-T is effected under mild conditions. The mole ratio of chloramine-T to the 1,3-oxathiolane, 1,3-dithiolane or 1,3-dithiane being converted to the aldehyde or ketone may vary within relatively broad limits, e.g., within the range of about 1:1 to about 4:1, preferably about 2:1. At high chloramine-T to oxathiolane or dithiolane ratios, the yield of carbonyl compound recovered increases with decreasing reaction time. At ratios of about 2:1 to 4:1 the yields are quantitative. The isolation of the carbonyl compound may be facilitated at the higher chloramine-T molar ratios.

The time of contact with the chloramine-T may also vary within relatively broad limits. The reaction is very rapid, usually being complete in a few minutes.

The reaction normally occurs readily at room temperature but in some instances slight heating, e.g., up to about 50° C. may be desirable.

This process of producing aldehydes and ketones is especially adaptable to a method of protecting carbonyl groups during various chemical syntheses. The oxathiolane and dithiolane groups are acid stable protective groups which may now be removed according to this invention under mild, nearly neutral aqueous conditions. This allows other functional groups to be present without removal or disruption. After formation of the oxathiolane or dithiolane, treatments such as a Grignard reaction, reduction with lithium aluminum hydride or other organometallic reactions may be performed. The protective group is then readily removed according to this invention to regenerate the carbonyl group of the aldehyde or ketone.

The following examples are illustrative of the process of this invention. All temperatures are on the centigrade scale.

Example 1

To 0.780 g. (0.00275 mol.) of chloramine-T dissolved in 5.2 ml. of 96% methanol-water was added 0.62 g. (0.00256 mol.) of 2,2-diphenyl-1,3-oxathiolane. The solution warmed slightly and a precipitate formed at once. The reaction mixture was then treated with portions of a solution containing 0.807 g. (0.00285 mol.) of chloramine-T in 3.971 g. of methanol. The reaction mixture was examined by thin layer chromatography (TLC) on Merck Kieselgel HF 254 (glass support) using ether or benzene as eluents. Two prepared solutions, one containing p-toluene-sulfonamide, bis[2-hydroxyethyl]disulfide and the oxathiolane; the other, bis[2-hydroxyethyl] disulfide and benzophenone, were used for reference. All of the oxathiolane had been consumed by the time a total of 1.113 g. (0.00393 mol.) of chloramine-T had been added. After addition of all the chloramine-T, 1.587 g. (0.0056 mol.), the spot corresponding to bis[2-hydroxyethyl]disulfide was absent from the chromatogram. The reaction mixture was diluted with 10% sodium chloride brine, made strongly basic with 33% sodium hydroxide and extracted with 10 ml. and 5 ml. portions of benzene, then a 10 ml. portion of ether. After being dried over sodium sulfate, the extract was evaporated to yield 0.466 g. of an oil which crystallized to yield a solid, M.P. 44.3–47.3° C. Mixed M.P. with benzophenone 45.0–47.8° C. Yield 100%.

Example 2

To 1.46 g. of 2-phenyl-1,3-dithiolane (0.08 mol.) in 6 ml. of 96% ethanol was added slowly a solution of 4.6 g. of commercial chloramine-T (0.16 mol.) in 14 ml. of 85% methanol-water. The reaction mixture warmed up and a white precipitate formed. The dropping funnel which had contained the chloramine-T was rinsed with 3 ml. of methanol and this was added to the reaction mixture.

After 5 minutes, 20 ml. of 10% sodium chloride brine was added to the reaction mixture which was then extracted with 10 ml. and 6 ml. portions of benzene. The combined benzene extract was dried over sodium sulfate and 0.85 g. of cyclohexanone was added. The extract was analyzed by gas liquid chromatography using a 20' x 1/8' column of LAC–728 on Hipax. He flow rate of 30 mls./min., an oven temperature of 140° C., and a catharometer detector.

Peak areas were measured using a planimeter. Relative sensitivity factors (wt.) of 1.000 for cyclohexanone and 0.927 for benzaldehyde were used. A 92% yield of benzaldehyde was obtained.

A blank of the extraction procedure was performed using 0.778 g. of benzaldehyde and the same quantities of the other solvents that were used in the experiment. After extraction and drying 0.816 g. cyclohexanone was added to the G.L.C. analysis as before gave 91.5% recovery. Actual yield of benzaldehyde was thus 100%.

Example 3

To 1.150 g. of 1,4-oxathiospiro[4,4]nonane (0.00799 mol.) in 2 ml. of technical methanol was added a solution of 2.40 g. (0.00850 mol.) of chloramine-T in 12 ml. of 83% methanol-water. The reaction mixture warmed up and a white precipitate formed. The flask which had contained the chloramine-T was rinsed with 2 ml. of methanol and this was added to the reaction mixture. After two minutes, 10 ml. of 10% sodium chloride brine was added to the reaction mixture which was then extracted with 10 ml., 5 ml. and 5 ml. portions of ethyl ether. To the combined extract was added 0.510 g. of cyclohexanone and the extract was extracted with 10 ml. of water and 10 ml. of 10% sodium hydroxide. The extract was dried over sodium sulfate and analyzed by gas liquid chromatography, using 20' x 1/8' column of 2% LAC–728 in Hipax, He flow rate of 30–40 mls./min., an oven temperature of 125° C., and a catharometer detector. Peak areas were measured using a Varian 400 integrator. Relative sensitivity (wt.) factors of 1.000 for cyclohexanone and 1.07 for cyclopentanone were used. Three determinations gave 46.8%, 46.6% and 46.6% of cyclopentanone.

A blank of the extraction procedure was performed using 0.663 g. of cyclopentanone and the same quantities of the other solvents that were used in the experiment. After extraction, 0.552 g. of cyclohexanone was added and the G.L.C. analysis as before gave 51.8%, 51.5% and 50.7% recoveries. Actual yield of cyclopentanone was thus 46.7% + 51.3% = 90.9%.

Example 4

A solution of 1.84 g. chloramine-T, 3 $H_2O$ ($6.4 \times 10^{-3}$ mol.) in 15 ml. of 80% methanol was slowly added to a stirred suspension of 0.408 g. ($1.6 \times 10^{-3}$ mol.) of spiro [1,3-dithiole-2,9'-fluorene] in 10 ml. of methanol and 5 ml. of 96% ethanol. After the addition, the reaction mixture was stirred for 5 minutes. The mixture was then diluted with 20 ml. of 10% sodium chloride brine and extracted with ether (1× 15 ml., 1× 10 ml.). The ether extract was extracted with 2 N NaOH (1× 20 ml., 1× 15 ml., 1× 10 ml.); dried ($MgSO_4$); and the solvent removed in a rotary evaporator, affording an orange-yellow oil, that readily solidified, 280 mg., M.P. 68–73° C.

This material was filtered through a short column (aluminum oxide, activity I, acid), using benzene as the eluant.

Evaporation of the solvent afforded fluorenone as a yellow solid, 259 mg. (90%), M.P. 77–80° C.

Crystallization from benzene/petroleum-ether 40–60° gave 247 mg. (86%) of fluorenone, M.P. 82–83° C., mixed melting point with fluorenone 82–83° C.

Example 5

The following additional ketones were obtained by the procedure of Example 4 from the corresponding 1,3-dithiolane:

| Ketone | Moles, chloramine-T; moles, dithiolane | Reaction medium | Yield RR'C=O, percent |
|---|---|---|---|
| Ethyl methyl ketone | 2 | 90% MeOH | 98 |
| Cyclopentanone | 3 | 90% MeOH | 81 |
| Cyclohexanone | 2 | 90% MeOH | 95 |
| Benzaldehyde | 2 | 90% MeOH | 100 |
| Acetophenone | 2 | 90% MeOH | 85.5 |
| Acetophenone | 2.5 | 90% MeOH | 77.5 |
| Cholestane-3-one | 4 | 90% MeOH | 75 |

Example 6

The following ketones were obtained by the procedure of Example 1 from the corresponding 1,3-oxathiolane:

| R | R' | Moles, chloramine-T; moles, dioxalane | Reaction medium | Yield, RR'C=O, percent |
|---|---|---|---|---|
| | —(CH$_2$)$_4$— | 1.03 | 85% MeOH—H$_2$O | 91 |
| | —(CH$_2$)$_5$— | 0.88 | 96% EtOH—H$_2$O | 88 |
| | —(CH$_2$)$_6$— | 1.03 | 85% MeOH—H$_2$O | 98 |
| (CH$_3$)$_3$C | CH$_3$ | 1.79 | MeOH | 85 |
| CH$_3$ | CH$_2$CO$_2$C$_2$H$_5$ | 1.00 | 96% EtOH—H$_2$O | 96 |
| C$_6$H$_5$ | CH$_3$ | 0.89 | 96% EtOH | 88 |
| C$_6$H$_5$ | C$_6$H$_5$ | 2.18 | 96% MeOH—H$_2$O | 100 |
| (CH$_3$)$_2$CH | H | 2.0 | H$_2$O | 62 |
| C$_6$H$_4$ | H | 0.88 | 96% EtOH—H$_2$O | 90 |

Example 7

A solution of 2.2 g. chloramine-T, 3H$_2$O (8×10$^{-3}$ mol.) in 20 ml. of 80% methanol was slowly added to a stirred solution of 0.540 g. (2×10$^{-3}$ mol.) of spiro[1,3-dithiane-2,9'-fluorene] in 10 ml. of acetone. After the addition, the reaction mixture was stirred for 15 minutes. The mixture was then diluted with 25 ml. of 10% sodium chloride brine and extracted with 2 N sodium hydroxide (1× 20 ml., 1× 15 ml., 1× 10 ml.); dried over magnesium sulfate and the solvent removed in a rotary evaporator, affording an orange-yellow oil (0.418 g.).

This material was filtered through a short column (aluminum oxide, activity I, acid) using benzene as the eluant. Evaporation of the solvent afforded fluorenone as yellow oil that readily solidified. Crystallization from benzene/petroleum ether 40–60° gave 0.3 g. (83.5%) of fluorenone 81–82° C.

Example 8

By utilizing 2-phenyl-1,3-dithiane in the procedure of Example 7, benzaldehyde was obtained.

What is claimed is:

1. A procss for the production of a steroidal ketone of the formula $$\underset{R^1}{\overset{R}{\diagdown}}C=O$$

wherein R and R$^1$ together form the cyclopentaneophenanthrene nucleus and the carbonyl group is in the 3-, 17- or 20-position, which comprises reacting chloramine-T with a compound of the formula

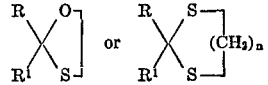

wherein R and R$^1$ have the same meaning as above and $n$ is 0 or 1.

2. A process as in claim 1 wherein the steroid is a steroid of the pregnane series.

3. A process as in claim 1 wherein the steroid is a steroid of the androstane series.

4. A process as in claim 2 wherein the steroid is cholestane-3-one.

No references cited.

HENRY A. FRENCH, Primary Examiner

U.S. Cl. X.R.

260—397.3, 397.4, 586 R, 590, 592, 593 R, 599, 601 R